Figure 1:
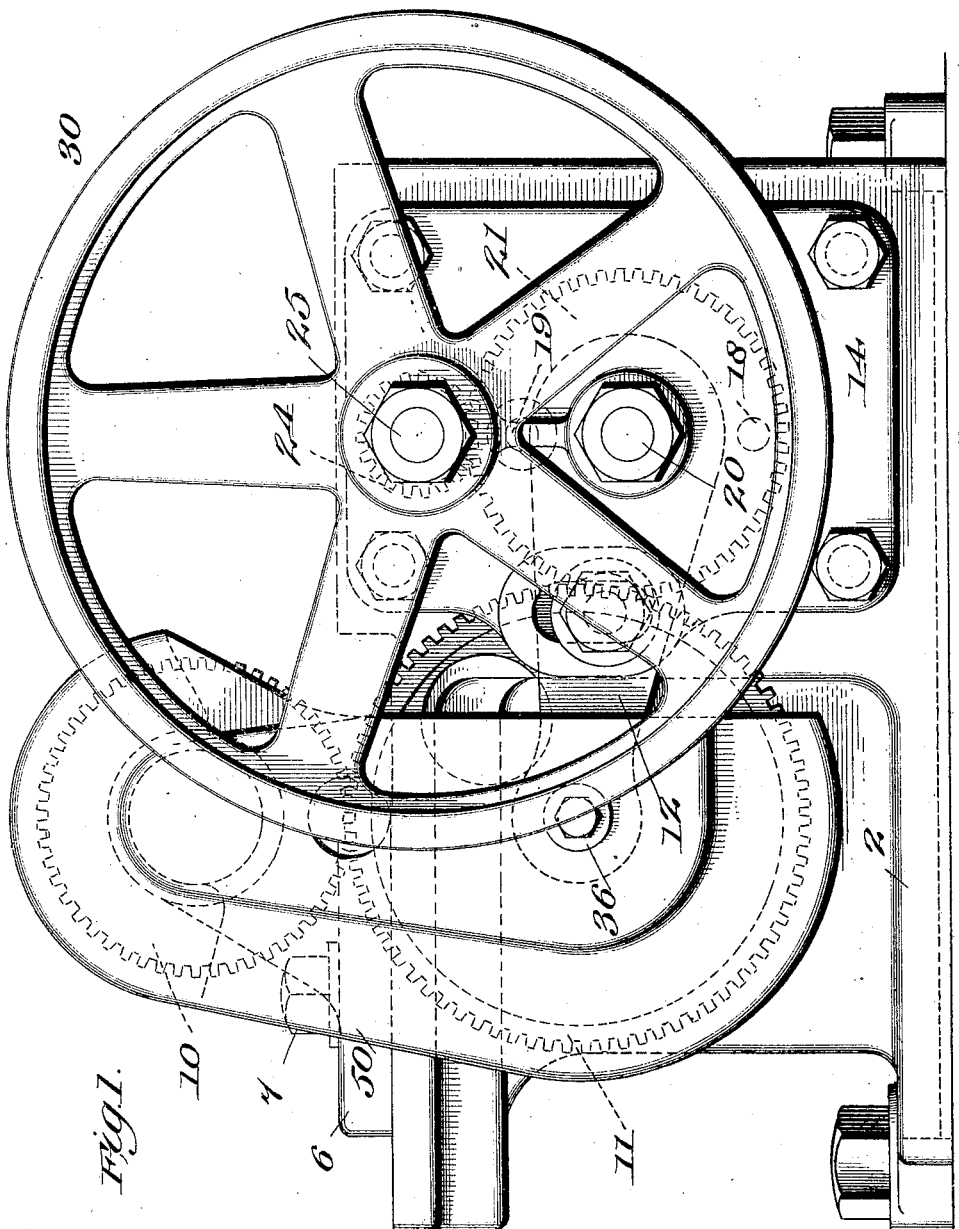

R. B. WEAVER.
APPARATUS FOR CHAMFERING GEAR TEETH.
APPLICATION FILED JAN. 25, 1908.

909,719.

Patented Jan. 12, 1909.

6 SHEETS—SHEET 1.

R. B. WEAVER.
APPARATUS FOR CHAMFERING GEAR TEETH.
APPLICATION FILED JAN. 25, 1908.

909,719.

Patented Jan. 12, 1909.

6 SHEETS—SHEET 2.

Witnesses

Inventor

R. B. WEAVER.
APPARATUS FOR CHAMFERING GEAR TEETH.
APPLICATION FILED JAN. 25, 1908.

909,719.

Patented Jan. 12, 1909.

6 SHEETS—SHEET 4.

R. B. WEAVER.
APPARATUS FOR CHAMFERING GEAR TEETH.
APPLICATION FILED JAN. 25, 1908.
909,719.
Patented Jan. 12, 1909.
6 SHEETS—SHEET 5.
Fig. 5.
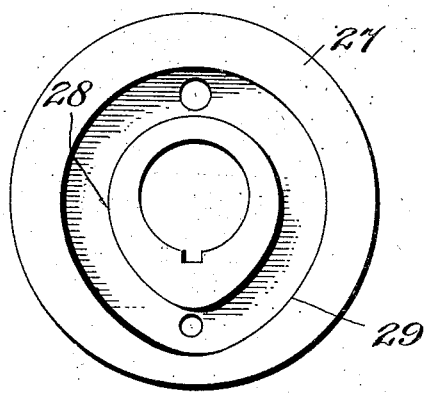
Fig. 10.
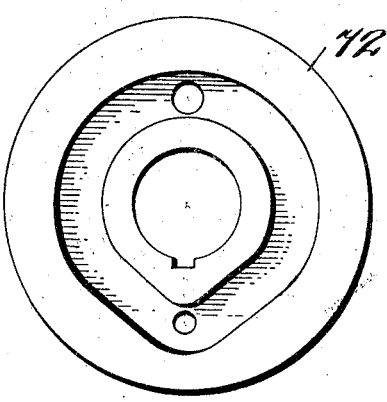
Fig. 6.    Fig. 7.    Fig. 8.
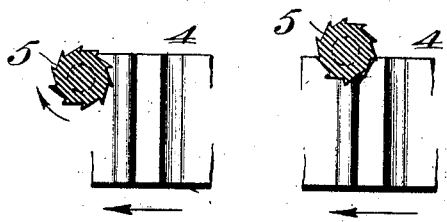 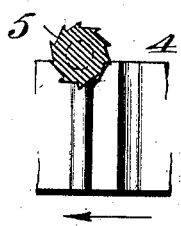 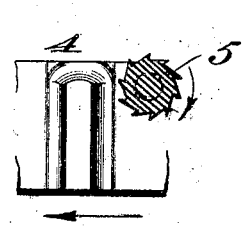
Fig. 9.
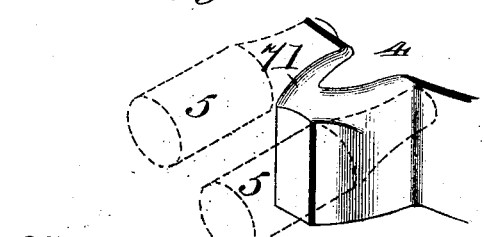
Fig. 11.
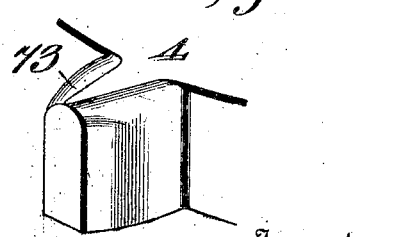
Witnesses
Geo. H. Bignell.
W. May Duvall.
Inventor
R. B. Weaver by
Wickerson Fisher
& Wilkinson
Attorneys R. B. WEAVER.
APPARATUS FOR CHAMFERING GEAR TEETH.
APPLICATION FILED JAN. 25, 1908.

909,719.

Patented Jan. 12, 1909.

6 SHEETS—SHEET 6.

Witnesses
Geo. H. Pepue
W. May. Durall

Inventor
R. B. Weaver by
Wilkinson Fisher
& Wilkinson
Attorneys

UNITED STATES PATENT OFFICE.

ROBERT B. WEAVER, OF CLEVELAND, OHIO, ASSIGNOR TO LONG ARM SYSTEM COMPANY, OF CLEVELAND, OHIO, A CORPORATION OF OHIO.

APPARATUS FOR CHAMFERING GEAR-TEETH.

No. 909,719.  Specification of Letters Patent.  Patented Jan. 12, 1909.

Application filed January 25, 1908. Serial No. 412,621.

*To all whom it may concern:*

Be it known that I, ROBERT B. WEAVER, a citizen of the United States, residing at Cleveland, in the county of Cuyahoga and State of Ohio, have invented certain new and useful Improvements in Apparatus for Chamfering Gear-Teeth; and I do hereby declare the following to be a full, clear, and exact description of the invention, such as will enable others skilled in the art to which it appertains to make and use the same.

My invention relates to an apparatus for chamfering the teeth of gears in order to facilitate sliding the teeth of one gear wheel into mesh with those of another, whenever a change of gears is desired.

It is well known that in automobiles, and in other machines employing gearing, it is very desirable to have one or both ends of the gear teeth rounded, or chamfered, so as to easily engage and disengage other teeth when slid along their shafts to effect a change of speed, or a reversal of parts. Heretofore this tooth chamfering has been done by hand filing, which is very tedious and expensive, as well as inaccurate, and it has also been done by machinery. But in the only machines with which I am acquainted, this operation has been either slow and inaccurate in that it required the going over of every tooth by hand filing after the machining is done, or the machine itself has been slow, heavy, expensive and complicated, and the results not at all satisfactory.

It is to overcome the above defects, which is the object of my invention, and to these ends my invention consists in the novel mechanism comprising a fixed rotary cutter, and an automatic means for moving the teeth of the gear to be cut in directions both rotary and endwise with reference to the axis of said gear. This mechanism, of course, may be made as an independent machine and used to chamfer the teeth of any gears whatever, but I prefer, when it is to be used in automobile work, to make it as an attachment to be placed on the platen of a small miller, a horizontal boring mill, or on the tool carriage of a small lathe.

My invention further consists in the novel combinations of parts more fully hereinafter described and particularly pointed out in the claims.

Figure 2:
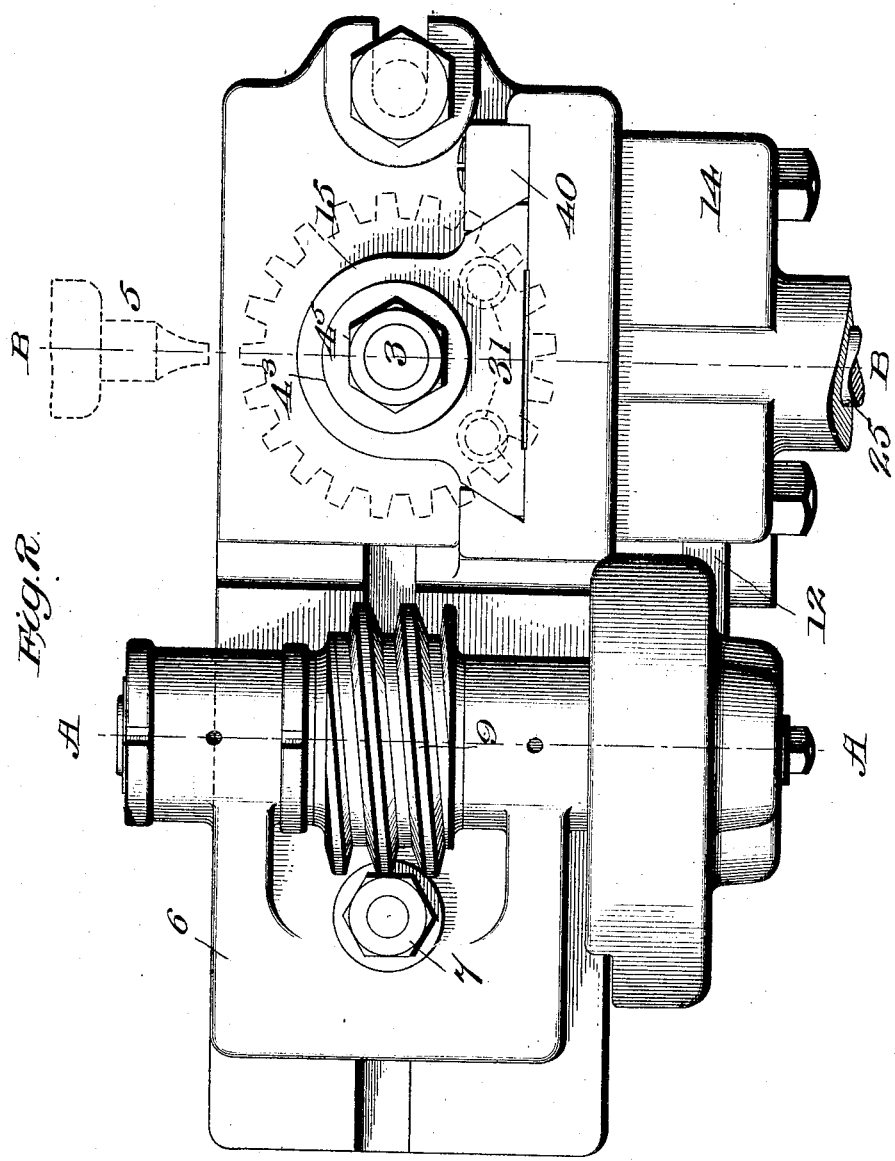
Figure 3:
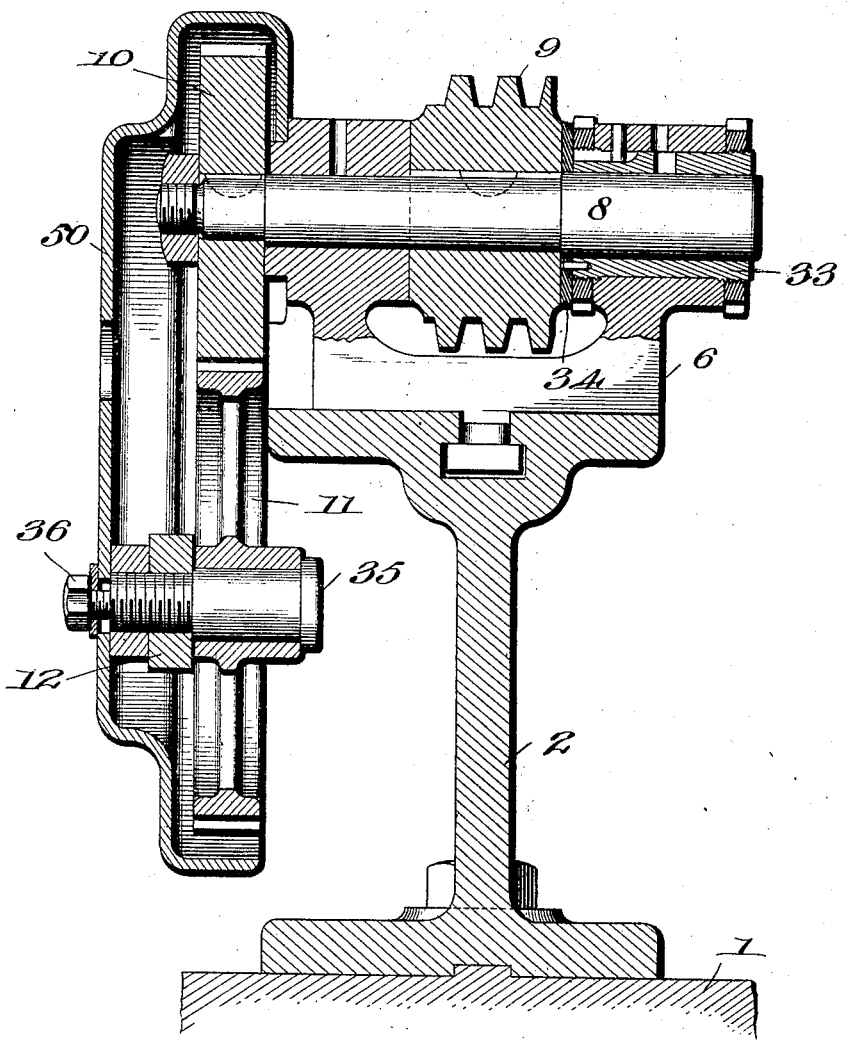
Figure 4:
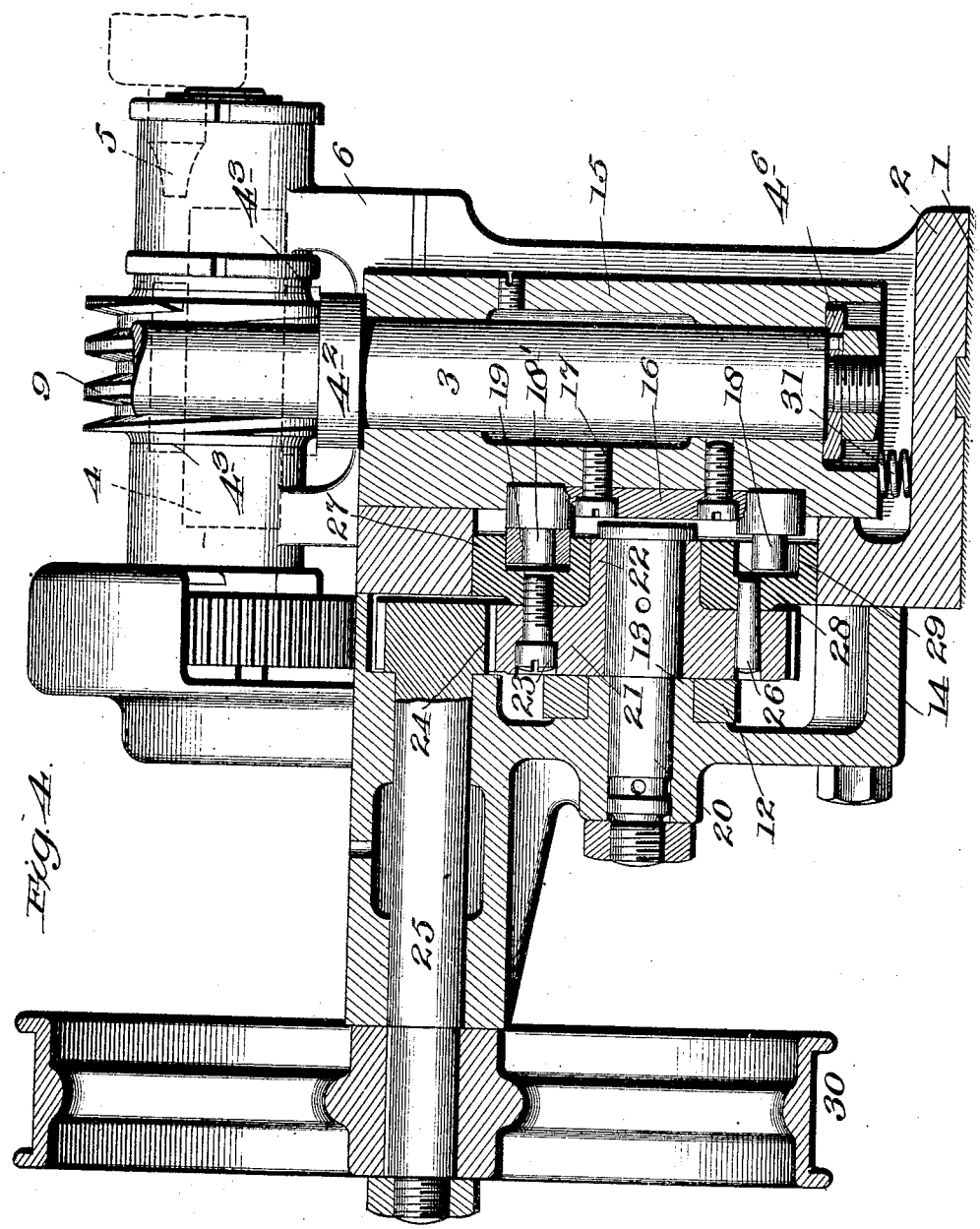
Figure 12:
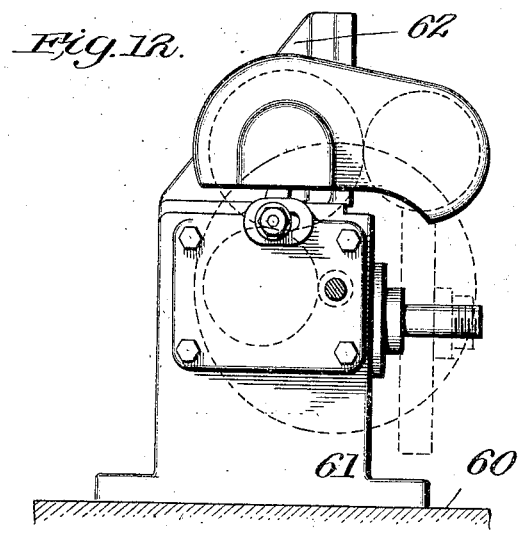
Figure 13:
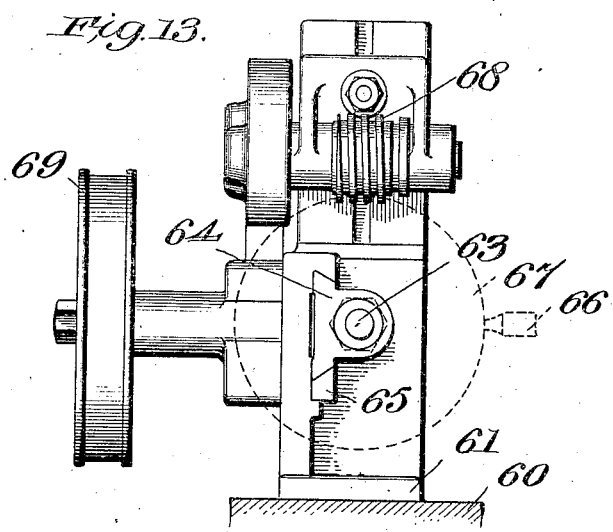

Referring to the accompanying drawings forming a part of this specification:—Figure 1, represents an end elevation of my tooth chamfering attachment. Fig. 2, a plan view of the same. Fig. 3, a sectional view taken on the line A—A of Fig. 2. Fig. 4, a sectional view taken on the line B—B of Fig. 2. Fig. 5, a detail view of the cam for controlling the motion of the tooth being chamfered. Figs. 6, 7 and 8, different positions of the tooth with relation to the cutter. Fig. 9, a perspective view of a finished tooth, showing two positions of the cutter relative thereto. Fig. 10, a detail view of a modified form of cam for controlling the motion of the tooth. Fig. 11, a perspective of a tooth having a modified chamfered edge. Figs. 12 and 13, end and side elevational views of a modification, and Fig. 14, a plan view of the frame casting.

Like numerals indicate like parts in all the views.

1, represents the platen of the miller, lathe or other machine to which my attachment is secured; 2, a frame casting supporting the several parts of my machine; 3, the work spindle; 4, the rotating and reciprocating work, or gear, whose teeth are to be chamfered; and 5, the fixed rotating cutter. The work 4, is secured to the spindle 3, by suitable collars $4^2$, washers $4^3$, and a nut $4^5$, as shown.

To the casting 2, is fitted the slide 6, provided with the clamping nut 7, and in this slide is suitably journaled the spindle 8, provided with the worm 9, adapted to intermesh with the work 4, and thereby control the rotary motion of the latter.

The spindle 8, is provided with the gear 10, which meshes with the idler 11, mounted on the end of the arm 12, pivoted on the projection 13, carried by the compound bracket bearing 14, secured to the casting 2.

The work spindle 3, is mounted in the sliding block 15, to which is secured by means of the screws 17, the pin bracket 16, carrying the pins 18 and 18', one of which is provided with the roller 19.

Passing through the projection 13, is the spindle 20, on which is mounted the gear wheel 21, provided with the projection 22, and meshing with the pinion 24, on the shaft 25, carrying the power pulley 30. This gear wheel 21, also, meshes with the idler gear wheel 11, as shown.

Mounted on the projection 22, and secured to the gear wheel 21, by the screw 23, and conical peg 26, is the revolving cam 27, having the cam surfaces 28 and 29, against the latter of which the roller 19, works, when on the pin 18′.

31, represents springs supporting the weight of the work, the work spindle and slide; and these springs serve, when the cutter is working on the top ends of the teeth, to keep the roller 19, when on the top pin 18′, pressed constantly against the outside surface 29. When working on the bottom ends of the teeth, the roller 19, is shifted to the pin 18, and these springs 31, then serve to keep said roller pressed against the inside cam surface 28.

To insure absolute adjustment and to avoid back lash in the worm, one bearing of the spindle 8, is provided with an adjustable locking sleeve 33, having the washer 34, attached thereto as shown.

To hold the idler 11, always in mesh with the main drive gear 21, and worm drive gear 10, the said idler gear 11, is pivoted on the end of the radial arm 12, having a locking bolt 35 and nut 36. This arm 12 is provided with a pivot 100, adjustable in a slot 101 in the bracket 14 as shown in Fig. 1.

The milling cutter 5, which has only a rotating movement, may be held and driven by the spindle of the lathe, miller, or other machine to which my invention is attached, and the parts being assembled with the work in place as shown the operation so far described is as follows:—The slide 6, is brought forward until the worm 9, meshes properly with the teeth of the work 4, and is then secured by the clamp 7. The platen 1, of the miller or other machine to which my attachment is secured is then moved to bring the center of the work in line with the cutter, and also moved to bring the work up to the cutter. Power being now applied to the pulley 30, is transmitted through spindle 25, pinion 24, and gears 21, 11 and 10, to the spindle 8, and worm 9, which accordingly rotates and causes the work to also slowly rotate. While the work is rotating the gear 21, causes the cam 27, which is fixed thereto, to rotate and thereby reciprocate the roller 19, bracket 16, and sliding block 15, which is secured to said bracket. The sliding block engages the collar $4^2$ and $4^6$, on the work spindle, and reciprocates the latter with the work, at the same time, the worm 9, is causing the work to slowly revolve. The shape of the cam surface 29, is such and the cam is so timed, that the upper end of the tooth to be chamfered is lowered while being turned by the worm from the position shown in Fig. 6, to the position shown in Fig. 7; and is further lowered and turned until the cutter rests on top of the end of said tooth after having chamfered off one edge thereof. When this latter position is reached, the cam then causes the tooth while still rotating under the influence of the worm 9, to rise, and the cutter, after having chamfered off the outer edge, occupies the position relative to the tooth shown in Fig. 8. These two extreme positions of the cutter relative to the tooth are best shown in dotted lines in Fig. 9, as well as the shape of the end of the tooth, after having been chamfered under the control of cam 27. As the worm continues to rotate, new teeth are subjected to the chamfering action, and the cam and worm continue to cause their ends to roll down one side of the cutter, so to speak, and up on the other side; and therefore the machine, or attachment as the case may be, will chamfer automatically both edges of all the teeth on one side of the gear wheel without any indexing, or other attention being required. When the lower ends of the teeth are to be chamfered, the roller 19, is placed on the pin 18, and the cam surface 28, is employed in connection with the roller 19, to carry out the above cycle of operations; but in such case, the work being above the cutter, instead of below it, as shown in Fig. 4, the tooth will roll up and over the cutter and then down on the other side of the same, instead of down over and up on the other side of the cutter, as explained above. The result is that the teeth are automatically rounded or chamfered, smoothly, uniformly and rapidly by the cutter, leaving no spot or edge to be file finished. And by giving different shapes to the cams as shown in Figs. 5 and 10, any desired form may be given to the chamfer.

The spindle 3, is capable of adjustment, change or renewal by means of the nut and collar $4^6$, on its lower end. The guide gib 40, see Fig. 2, in the ways of the slide 15, affords an accurate means of taking up wear at that point. The taper pin 26, insures the accurate maintenance of position between the cam 27, and the driving gear 21. The compound bearing frame casting 2, holds and preserves the relations of all the parts from the pulley to the cam pins, and to the worm drive gear 9. The gear guard 50, is readily attached and detached, and serves to protect the workman. The cam roller 19, is readily shifted upon removing the guide gib 40, and work slide 15.

Figure 14:
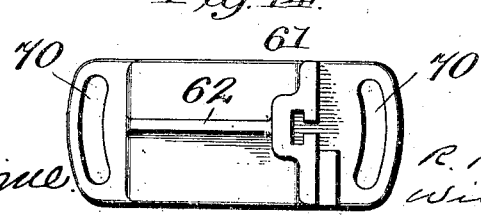

In the modification shown in Figs. 12, 13 and 14, the work spindle is disposed horizontally instead of vertically. This arrangement of the spindle makes it possible to set the work at varying angles with the rotating cutter, and therefore to automatically give the chamfered surface any desired form. In this modification, 60, represents the milling or other machine table, 61, the base of my attachment, 62 a vertical web, 63, the horizontally disposed work spindle, 64, a cam operated work slide, 65, a guide gib, 66, the cutter, 67, the work, 68, the drive worm located above the work, and 69, the power transmitting pulley, all like or substantially like the corresponding parts above described, except the work spindle is horizontal instead of vertical, and the worm slide is vertical instead of horizontal. The base 61, is provided with the curved slots 70, struck from the center of the base, and permitting the said base and the whole attachment including the work spindle to be swiveled to the support 60; and therefore permitting the plane of the work 67, to make any desired angle with the axis of the cutter 66. It results directly from this disposition of the parts, that the teeth may be cut more below the pitch line than above it, and that in fact any desired contour may be given to the chamfered surfaces. It is of course apparent that in this modification if the plane of the work coincides with or is parallel to the axis of the center, then a cam such as 27, will give a chamfered contour 71, such as is illustrated in Fig. 9, or if a cam such as 72, shown in Fig. 10, is employed, the contour 73, shown in Fig. 11, will be given the end of the tooth. The same, of course, will also be true of the form of my invention first described. But, in this modified form of my attachment, I may while employing either of these cams, or any other suitable cams, further modify the contours of the chamfered ends of the teeth, by simply rotating the work until its plane makes the desired angle with the axis of the cutter. In other words, this modified form of my invention will not only do all that the first form will do, but it will give additional forms to the ends of the teeth without changing the cams.

In neither form of my invention is it necessary to stop either the milling or other machine to which my attachment is secured, nor the attachment itself, when it is desired to change the work; for all that it is necessary to do is to simply move the table, or other support of the attachment, away from the column of the machine, and to take off one piece of work and to put on another, and to then slowly move the table back to the transverse top of the machine.

It will thus be observed that by means of chamfering the ends of gear teeth, I am enabled to secure the gears to be operated on to a suitable work spindle, and to reciprocate the ends of the teeth past a fixed rotating cutter while slowly revolving the same around the axis of the work spindle. That the effect of this simultaneous reciprocation and rotation of the ends of the teeth is to cause one side of the same end of the teeth to be always cut on one phase of the reciprocation, and the other side of the said end to be cut on the reverse phase of the movement; so that the surface to be chamfered rolls, so to speak, down on one side of the fixed cutter, under the same and up on the other side, for one end of the teeth, and up on one side over and down on the other side of said cutter, for the other end of the teeth. The advantages of this motion for chamfering gear teeth over any others with which I am familiar are:—The continuous and automatic action of the cutter on the chamfered surfaces, produces a much greater output in the same time; the very small size and weight of my attachment in comparison with a heavy machine for doing the same work, enables floor space to be saved, and all waste of power, except when the attachment is in actual use. And the fact it is an attachment, enables it to be put onto any suitable machine to do a temporary job and then immediately taken off. And the further fact that the gear to be chamfered furnishes its own index, causes a great deal of time to be saved, which is necessarily lost, where indexing must be done by hand, as is the case on all the machines for doing this work with which I am acquainted.

Of course, I do not wish to be understood as limiting my invention to the exact procedure and details of construction above set forth, since it is evident that they may be widely varied without departing from the spirit of invention.

What I claim is:—

1. In a gear chamfering machine the combination of a rotary cutter; a reciprocating work slide adapted to reciprocate the gear whose teeth are to be chamfered, and a rotatable gear adapted to engage and to continuously revolve said teeth around the axis of said slide, substantially as described.

2. In a gear chamfering machine the combination of a rotary cutter; a work slide adapted to reciprocate the gear teeth to be chamfered; a suitable cam adapted to reciprocate said slide, and a rotatable gear adapted to engage said teeth and continuously revolve the same, substantially as described.

3. In a gear chamfering attachment the combination of a rotary cutter; a work spindle adapted to hold the gear whose teeth are to be chamfered; a work slide adapted to reciprocate said teeth on different sides of said cutter; a suitable cam adapted to reciprocate said slide; a gear adapted to engage said teeth and to continuously revolve the same around the axis of said spindle as a center, and a common means for continuously revolving said cam and gear, substantially as described.

4. In a gear chamfering attachment the combination of a rotary cutter; a work spindle adapted to hold the gear whose teeth are to be chamfered; a work slide adapted to reciprocate said teeth on different sides of said cutter; a suitable cam and connections adapted to reciprocate said slide; a gear adapted to engage said teeth to index the same and to continuously revolve the same around the axis of said spindle as a center, and a common means comprising a set of gearing for continuously revolving said cam and gear, substantially as described.

5. In a gear chamfering attachment, the combination of a rotary cutter; a work spindle; means to clamp thereto the gear having the teeth to be chamfered; a slide adapted to reciprocate said teeth; a bracket on the slide provided with a roller; a cam for reciprocating the roller; a gear for continuously rotating said teeth; a power pulley and a train of gears driven by the same for simultaneously operating said cam and said gear, substantially as described.

6. In a gear chamfering attachment, the combination of a rotary cutter; a work spindle; means to clamp thereto the gear having the teeth to be chamfered; a slide adapted to reciprocate said teeth; a bracket on the slide provided with a roller; a cam for reciprocating the roller; an adjustable worm for continuously rotating said teeth; a power pulley and a train of gears driven by the same for simultaneously operating said cam and said worm, substantially as described.

7. In a gear chamfering machine the combination of a rotary cutter; a work spindle; means to incline the axis of the same to the axis of said cutter; a reciprocating work slide adapted to reciprocate the gear whose teeth are to be chamfered, and a rotatable gear adapted to engage and to continuously revolve said teeth around the axis of said slide, substantially as described.

8. In a gear chamfering machine the combination of a rotary cutter; a work spindle; means to incline the axis of the same to the axis of said cutter; a work slide adapted to reciprocate the gear teeth to be chamfered; a suitable cam adapted to reciprocate said slide, and a rotatable worm adapted to engage said teeth and continuously revolve the same while the cutter successively acts on different surfaces of said teeth, substantially as described.

9. In a gear chamfering attachment adapted to coöperate with a cutter, the combination of a work spindle adapted to hold the gear whose teeth are to be chamfered; a work slide adapted to reciprocate said teeth; a suitable cam adapted to reciprocate said slide; means adapted to engage said teeth and to continuously revolve the same around the axis of said spindle as a center; means for continuously revolving said cam and first mentioned means; and means for angularly adjusting the work in the plane of the cutting action, substantially as described.

10. In a gear chamfering attachment adapted to coöperate with a cutter, the combination of a work spindle; means to secure thereto the gear having the teeth to be chamfered; a slide adapted to reciprocate said teeth; a bracket on the slide; means for reciprocating said slide; means for continuously rotating said teeth; a power pulley; a train of gears driven by the same for simultaneously operating said slide reciprocating means and said teeth rotating means; and means for angularly adjusting the work in the plane of the cutting action, substantially as described.

11. In gear chamfering mechanism, the combination of a cutter; means to support the gear whose teeth are to be chamfered in proper relation to said cutter; means to reciprocate said teeth while being chamfered; means to rotate said teeth while the same are being reciprocated; and means permitting said support and gear to be angularly adjusted relative to the said cutter, substantially as described.

12. In a gear chamfering attachment adapted to coöperate with a cutter, the combination of a support; a work spindle adapted to hold the gear whose teeth are to be chamfered; means to swivel said attachment on its support and thereby permit the work to be angularly adjustable in the plane of the cutting action; and means to reciprocate said teeth, substantially as described.

13. In a gear chamfering attachment adapted to coact with a cutter, the combination of a support; a work spindle adapted to hold the gear whose teeth are to be chamfered; means to swivel said attachment on its support and thereby permit the angular adjustment of the gear blank in the plane of the cutting action, means to continuously revolve said teeth around the axis of said spindle; and means to simultaneously reciprocate said teeth, substantially as described.

In testimony whereof, I affix my signature, in presence of two witnesses.

ROBERT B. WEAVER.

Witnesses:
W. B. COWLES,
CHAS. C. TYLER.